United States Patent
Park et al.

(10) Patent No.: US 12,071,523 B2
(45) Date of Patent: Aug. 27, 2024

(54) SUPERABSORBENT POLYMER AND PREPARATION METHOD FOR THE SAME

(71) Applicant: LG Chem, Ltd., Seoul (KR)

(72) Inventors: Dong Hoon Park, Daejeon (KR); Young Jae Hur, Daejeon (KR); Taebin Ahn, Daejeon (KR); Jihye Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 646 days.

(21) Appl. No.: 17/424,694

(22) PCT Filed: Sep. 16, 2020

(86) PCT No.: PCT/KR2020/012473
§ 371 (c)(1),
(2) Date: Jul. 21, 2021

(87) PCT Pub. No.: WO2021/054711
PCT Pub. Date: Mar. 25, 2021

(65) Prior Publication Data
US 2022/0098373 A1  Mar. 31, 2022

(30) Foreign Application Priority Data

Sep. 18, 2019 (KR) .................. 10-2019-0114794
Sep. 15, 2020 (KR) .................. 10-2020-0118535

(51) Int. Cl.
C08J 3/24 (2006.01)
B01J 20/26 (2006.01)
C08F 2/10 (2006.01)
C08F 2/44 (2006.01)
C08F 20/04 (2006.01)
C08K 5/1515 (2006.01)

(52) U.S. Cl.
CPC ............. *C08J 3/245* (2013.01); *B01J 20/267* (2013.01); *C08F 2/10* (2013.01); *C08F 2/44* (2013.01); *C08F 20/04* (2013.01); *C08K 5/1515* (2013.01); *B01J 2220/68* (2013.01); *C08J 2333/02* (2013.01)

(58) Field of Classification Search
None
See application file for complete search history.

(56) References Cited

U.S. PATENT DOCUMENTS

| | | | |
|---|---|---|---|
| 2009/0131255 A1 | 5/2009 | Ikeuchi et al. | |
| 2013/0172180 A1 | 7/2013 | Naumann et al. | |
| 2015/0216740 A1* | 8/2015 | Watanabe | B01J 20/267 524/556 |
| 2015/0273433 A1 | 10/2015 | Nakatsuru et al. | |
| 2016/0220981 A1 | 8/2016 | Yim et al. | |
| 2017/0029576 A1 | 2/2017 | Lee et al. | |
| 2018/0037686 A1 | 2/2018 | Lee et al. | |
| 2020/0139344 A1 | 5/2020 | Kim et al. | |
| 2020/0308352 A1* | 10/2020 | Park | C08J 3/24 |

FOREIGN PATENT DOCUMENTS

| | | |
|---|---|---|
| EP | 2893974 A1 | 7/2015 |
| EP | 3521343 A1 | 8/2019 |
| EP | 3705510 A1 | 9/2020 |
| JP | 5591467 B2 | 9/2014 |
| JP | 2020504191 A | 2/2020 |
| KR | 20140107491 A | 9/2014 |
| KR | 20150067218 A | 6/2015 |
| KR | 101564526 B1 | 10/2015 |
| KR | 20160048838 A | 5/2016 |
| KR | 20170059937 A | 5/2017 |
| KR | 101745679 B1 | 6/2017 |
| KR | 101855351 B1 | 5/2018 |
| KR | 20190068408 A | 6/2019 |
| KR | 20190069101 A | 6/2019 |
| KR | 20190072298 A | 6/2019 |
| KR | 20190087208 A | 7/2019 |
| WO | 2014054731 A1 | 4/2014 |
| WO | 2019117511 A1 | 6/2019 |
| WO | WO-2019112150 A1 * | 6/2019 ............. A61L 15/60 |

OTHER PUBLICATIONS

International Search Report for Application No. PCT/KR2020/012473 mailed Dec. 30, 2020, pp. 1-2.
Odian, G. "Principles of Polymerization" Wiley-Interscience Publication, Copyright 1981, p. 203, Second Edition, John Wiley & Sons, Inc.
Schwalm, R. "UV Coatings Basics, Recent Developments and New Applications", Dec. 2006, p. 115, Elsevier Science.
Extended European Search Report including Written Opinion for Application No. 20864634.9 dated Jan. 17, 2022, pp. 1-15.
Thomson Scientific, "Database WPI Clarivate Analytics," Week 201953, An 2019-51805K, Jun. 20, 2019, 3 pages, London, GB. XP002805238.

* cited by examiner

*Primary Examiner* — Christopher M Rodd
(74) *Attorney, Agent, or Firm* — Lerner David LLP

(57) ABSTRACT

A method of preparing a superabsorbent polymer includes preparing a base resin in which an acrylic acid-based monomer having acidic groups which are at least partially neutralized and an internal crosslinking agent are crosslinked in the presence of a sodium polycarboxylate surfactant; and heating the base resin in the presence of a surface crosslinking agent to carry out surface modification of the base resin, wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more. The superabsorbent polymer provides improved rewetting property and liquid permeability.

17 Claims, No Drawings

SUPERABSORBENT POLYMER AND PREPARATION METHOD FOR THE SAME

CROSS-REFERENCE TO RELATED APPLICATION

The present application is a national phase entry under 35 U.S.C. § 371 of International Application No. PCT/KR2020/012473, filed on Sep. 16, 2020, which claims priority from, Korean Patent Application Nos. 10-2019-0114794 and 10-2020-0118535, filed on Sep. 18, 2019 and Sep. 15, 2020, respectively, the disclosures of which are hereby incorporated by reference herein.

TECHNICAL FIELD

The present invention relates to a superabsorbent polymer and a preparation method thereof. More particularly, the present invention relates to a superabsorbent polymer having excellent basic absorption performances such as water retention capacity while having improved rewetting property and liquid permeability, and a preparation method thereof.

BACKGROUND ART

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, sanitary pads, etc., but also for water retaining soil products for gardening, water stop materials for the civil engineering and construction, sheets for raising seedling, fresh-keeping agents for food distribution fields, materials for poultice or the like.

In most cases, these superabsorbent polymers have been widely used in the field of hygienic materials such as diapers, sanitary pads, etc. For these applications, superabsorbent polymers are required to exhibit high absorbency with respect to water, etc., and not to release the absorbed water even under an external pressure. In addition, superabsorbent polymers are required to well retain the shape even in a state, in which the volume is expanded (swelled) by absorbing water, and to exhibit excellent liquid permeability.

Further, a pressure by a user's weight may be applied to hygiene materials such as diapers, sanitary pads, etc. In particular, when liquid is absorbed by the superabsorbent polymer used in hygiene materials such as diapers, sanitary pads, etc., and then a pressure by a user's weight is applied thereto, a rewetting phenomenon, in which some liquid absorbed into the superabsorbent polymer is re-exuded, and a urine leakage phenomenon may occur.

Accordingly, various attempts have been made to suppress such a rewetting phenomenon. However, concrete methods capable of effectively suppressing the rewetting phenomenon have not yet been suggested.

DISCLOSURE

Technical Problem

To solve the above problems of the prior art, there are provided a superabsorbent polymer capable of suppressing rewetting and urine leakage phenomena, and a preparation method thereof.

Technical Solution

To achieve the above object, according to one aspect of the present invention, provided is a method of preparing a superabsorbent polymer, the method including the steps of:

preparing a base resin in which an acrylic acid-based monomer having acidic groups which are at least partially neutralized and an internal crosslinking agent are crosslinked in the presence of a sodium polycarboxylate surfactant; and heating the base resin in the presence of a surface crosslinking agent to carry out surface modification of the base resin, wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more.

Further, according to another aspect of the present invention, provided is a superabsorbent polymer including:

a base resin including a crosslinked polymer in which an acrylic acid-based monomer having acidic groups which are at least partially neutralized is crosslinked in the presence of a sodium polycarboxylate surfactant and an internal crosslinking agent including a first epoxy crosslinking agent having an epoxy equivalent weight of 100 g/eq or more to less than 130 g/eq, and a second epoxy crosslinking agent having an epoxy equivalent weight of 130 g/eq or more; and a surface crosslinked layer which is formed on the particle surface of the base resin and is prepared by further crosslinking the crosslinked polymer via a surface crosslinking agent.

Effect of the Invention

According to a superabsorbent polymer and a preparation method thereof of the present invention, provided is a superabsorbent polymer having excellent basic absorption properties while suppressing a rewetting phenomenon and a urine leakage phenomenon.

BEST MODE FOR CARRYING OUT THE INVENTION

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the present invention.

Hereinafter, a method of preparing a superabsorbent polymer according to one embodiment of the preset invention will be described in detail.

The method of preparing a superabsorbent polymer according to one embodiment of the preset invention may include the steps of:

preparing a base resin in which an acrylic acid-based monomer having acidic groups which are at least partially neutralized and an internal crosslinking agent are crosslinked in the presence of a sodium polycarboxylate surfactant; and heating the base resin in the presence of a surface crosslinking agent to carry out surface modification of the base resin, wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more.

In the specification of the present invention, the "base resin" or "base resin powder" means a polymer in the form of particles or powder obtained by polymerizing a water-soluble ethylene-based unsaturated monomer, followed by drying and pulverizing. It refers to a polymer in a state in which the surface modification or surface crosslinking step described below is not performed.

A water-containing gel polymer obtained by the polymerization reaction of the acrylic acid-based monomer is subjected to drying, pulverizing, size-sorting, surface crosslinking, etc., and is marketed as a powdery superabsorbent polymer product.

In recent years, not only absorption properties of superabsorbent polymers, such as absorbency and liquid permeability, but also how dryness of the surface may be maintained in a situation where diapers are actually used may be an important measure for evaluating diaper characteristics.

It was found that the superabsorbent polymer obtained by the preparation method according to one embodiment of the present invention is superior in absorption properties such as water retention capacity, absorbency under pressure, and liquid permeability, may maintain a dry state even after being swollen with water or brine, and may effectively prevent a rewetting phenomenon and a urine leakage phenomenon in which urine absorbed in the superabsorbent polymer is re-exuded, thereby completing the present invention.

In the method of preparing a superabsorbent polymer of the present invention, a monomer composition, as a raw material of the superabsorbent polymer, including an acrylic acid-based monomer having acidic groups which are at least partially neutralized, an internal crosslinking agent, and a polymerization initiator, is first prepared and polymerized to obtain a water-containing gel polymer, which is then dried, pulverized, and size-sorted to prepare a base resin.

This will be described in more detail below.

The monomer composition which is a raw material of the superabsorbent polymer includes an acrylic acid-based monomer having acidic groups which are at least partially neutralized and a polymerization initiator.

The acrylic acid-based monomer is a compound represented by the following Chemical Formula 1:

$R^1$—COOM$^1$     [Chemical Formula 1]

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer includes one or more selected from the group consisting of acrylic acid, methacrylic acid, and a monovalent metal salt, a divalent metal salt, an ammonium salt, and an organic amine salt thereof.

Herein, the acrylic acid-based monomers may be those having acidic groups which are at least partially neutralized. Preferably, the monomers may be those partially neutralized with an alkali substance such as sodium hydroxide, potassium hydroxide, ammonium hydroxide, etc. In this regard, a degree of neutralization of the acrylic acid-based monomer may be 40 mol % to 95 mol %, 40 mol % to 80 mol %, or 45 mol % to 75 mol %. The degree of neutralization may vary depending on the final physical properties. An excessively high degree of neutralization causes the neutralized monomers to be precipitated, and thus polymerization may not readily occur, whereas an excessively low degree of neutralization not only greatly deteriorates the absorbency of the polymer, but also endows the polymer with hard-to-handle properties, such as those of an elastic rubber.

The concentration of the acrylic acid-based monomer may be about 20 wt % to about 60 wt %, preferably about 40 wt % to about 50 wt % with respect to the monomer composition including the raw material of the superabsorbent polymer and a solvent, and may be properly controlled in consideration of polymerization time, reaction conditions, etc. However, when the concentration of the monomer is excessively low, the yield of the superabsorbent polymer may become low and economical efficiency may be reduced. On the contrary, when the concentration of the monomer is excessively high, there is a process problem in that part of the monomers is precipitated, or pulverization efficiency is lowered upon pulverization of the polymerized water-containing gel polymer, and the physical properties of the superabsorbent polymer may be deteriorated.

In the method of preparing a superabsorbent polymer of the present invention, a polymerization initiator used upon polymerization is not particularly limited, as long as it is generally used in preparing superabsorbent polymers.

Specifically, the polymerization initiator may be a thermal polymerization initiator or a photo-polymerization initiator by UV radiation depending on the polymerization method. However, even in the case of the photo-polymerization method, a certain amount of heat may be generated by UV irradiation, etc., and a certain amount of heat is generated with exothermic polymerization reaction, and therefore, a thermal polymerization initiator may be further included.

As the photo-polymerization initiator, a compound capable of forming radicals by a light such as UV may be used without limitations in view of constitution.

For example, one or more selected from the group consisting of benzoin ether, dialkyl acetophenone, hydroxyl alkylketone, phenyl glyoxylate, benzyl dimethyl ketal, acyl phosphine, and α-aminoketone may be used as the photo-polymerization initiator. Meanwhile, as the specific example of acyl phosphine, commercially available lucirin TPO, namely, 2,4,6-trimethyl-benzoyl-trimethyl phosphine oxide may be used. More various photo-polymerization initiators are well disclosed in 'UV Coatings: Basics, Recent Developments and New Application (Elsevier, 2007)' written by Reinhold Schwalm, p 115, however, they are not limited to the above described examples.

The photo-polymerization initiator may be included in an amount of about 0.01% by weight to about 1.0% by weight with respect to the monomer composition. If the concentration of the photo-polymerization initiator is too low, the polymerization rate may become low. If the concentration of the photo-polymerization initiator is too high, the molecular weight of the superabsorbent polymer may become low and its physical properties may not be uniform.

Further, one or more selected from the group consisting of persulfate-based initiators, azo-based initiators, hydrogen peroxide, and ascorbic acid may be used as the thermal polymerization initiator. Specific examples of the persulfate-based initiators may include sodium persulfate ($Na_2S_2O_8$), potassium persulfate ($K_2S_2O_8$), ammonium persulfate (($NH_4)_2S_2O_8$) or the like. Examples of the azo-based initiators may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis(2-[2-imidazolin-2-yl]propane)dihydrochloride, 4,4-azobis-(4-cyanovaleric acid) or the like. More various thermal polymerization initiators are well-disclosed in 'Principle of Polymerization (Wiley, 1981)' written by Odian, p 203, however, they are not limited to the above described examples.

According to one exemplary embodiment of the present invention, the monomer composition includes a sodium polycarboxylate surfactant and two kinds of internal cross-linking agents having different epoxy equivalent weights.

The sodium polycarboxylate surfactant is added to the monomer composition to disperse and stabilize bubbles that are naturally generated in the monomer composition during neutralization or polymerization, and to exhibit the effect of forming an inter-penetrating network (IPN) structure inside the superabsorbent polymer. Accordingly, when the sodium polycarboxylate surfactant is used, a large number of pores may be formed on the surface of the superabsorbent polymer, and the absorption rate and absorbency may be remarkably improved without deteriorating the rewetting property.

In order to secure the above effect, the sodium polycarboxylate surfactant is preferably included in an amount of 0.01 part by weight to 1 part by weight, or 0.1 part by weight to 0.5 parts by weight with respect to 100 parts by weight of the acrylic acid-based monomer. If the amount of the surfactant is less than 0.01 part by weight with respect to 100 parts by weight of the acrylic acid-based monomer, the above-described effect may not be secured. If the amount of the surfactant exceeds 1 part by weight, the absorption properties of the superabsorbent polymer may deteriorate, or there are problems of reduction of the surface tension or discoloration of the superabsorbent polymer.

Further, in order to secure the above-described effect, the sodium polycarboxylate surfactant may preferably have a density of 1.07 g/ml to 1.13 g/ml, and a weight average molecular weight in the range of 500 g/mol to 1,000,000 g/mol. The weight average molecular weight may be measured by gel permeation chromatography (GPC). Specifically, the sodium polycarboxylate surfactant may be a copolymer obtained by copolymerizing one or more monomers selected from the group consisting of hydrophilic monomers such as (meth)acrylic acid-based monomers, (meth)acrylic acid ester-based monomers, and alkoxy polyalkylene glycol mono(meth)acrylic acid ester-based monomers.

The (meth)acrylic acid-based monomers may be, for example, one or more monomers selected from the group consisting of acrylic acid, methacrylic acid, and a monovalent metal salt thereof, a divalent metal salt thereof, an ammonium salt thereof, and an organic amine salt thereof.

The (meth)acrylic acid ester-based monomers may be, for example, one or more monomers selected from the group consisting of 2-hydroxyethyl methacrylate, hydroxypropyl methacrylate, hydroxyethyl acrylate, hydroxypropyl acrylate, and a monovalent metal salt thereof, a divalent metal salt thereof, an ammonium salt thereof, and an organic amine salt thereof.

The alkoxy polyalkylene glycol mono(meth)acrylic acid ester-based monomers may be, for example, one or more monomers selected from the group consisting of methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, and ethoxypolyethylene glycol polypropylene glycol polybutylene glycol mono(meth)acrylate.

Specifically, the sodium polycarboxylate surfactant may be preferably a copolymer of methoxy polyethylene glycol mono(meth)acrylate and methacrylic acid, but is not limited thereto.

The internal crosslinking agent is for cross-linking the interior of the polymerized polymer of the acrylic acid-based monomer, and is distinguished from a surface crosslinking agent for cross-linking the surface of the polymer.

In the present invention, epoxy-based crosslinking agents may be included as the internal crosslinking agent, and a first epoxy crosslinking agent having an epoxy equivalent weight of 100 g/eq or more to less than 130 g/eq and a second epoxy crosslinking agent having an epoxy equivalent weight of 130 g/eq or more are used at the same time.

As described, when the internal crosslinking agents having different epoxy equivalent weights are used at the same time, the two kinds of crosslinking agents form different network structures, and thus liquid permeability and rewetting property of the superabsorbent polymer may be greatly improved, as compared with use of a single crosslinking agent. In particular, when a crosslinking reaction is performed using the two kinds of epoxy-based crosslinking agents in the presence of the above-described sodium polycarboxylate surfactant, an inter-penetrating network (IPN) structure is additionally formed inside the superabsorbent polymer due to the sodium polycarboxylate surfactant, and thus it is possible to obtain the effects of improving rewetting property and initial absorption rate while maintaining excellent centrifuge retention capacity.

In other words, as two kinds of crosslinking agents are chemically bound to the main chain of the polymer, each part of the crosslinked polymer networks exhibits different flexibility, and therefore, when the produced superabsorbent polymer absorbs water, the degree of gel shrinkage against an external pressure and flow characteristics of water may vary. Due to this structure, the superabsorbent polymer may exhibit improved rewetting properties and liquid permeability.

In the method of preparing a superabsorbent polymer of the present invention, only the first and second epoxy crosslinking agents may be used as the internal crosslinking agent, or an internal crosslinking agent commonly used may be further used, in addition to the first and second epoxy crosslinking agents. However, to secure the effects of improving the liquid permeability and the rewetting property of the superabsorbent polymer, it is more preferable that only the first and second epoxy crosslinking agents are used.

As the first and second epoxy internal crosslinking agents, a crosslinking agent having two or more epoxy functional groups capable of reacting with the carboxylic acid and carboxylate of the acrylic acid-based monomer may be used.

The first epoxy crosslinking agent may be used for overall internal crosslinking of the polymer which is obtained by polymerizing the acrylic acid-based monomers, and an epoxy crosslinking agent having an epoxy equivalent weight of 100 g/eq or more, or 110 g/eq or more, and less than 130 g/eq, or 125 g/eq or less, and having two or more, preferably, two epoxy functional groups in the molecule may be used. When the epoxy equivalent weight of the first epoxy crosslinking agent is less than 100 g/eq, there is a problem in that flexibility of the crosslinked polymer network may decrease and absorbency of the superabsorbent polymer may decrease. On the contrary, when the first epoxy crosslinking agent has the high epoxy equivalent weight of 130 g/eq or more, there is a problem in that a uniform crosslinking structure may not be formed.

Specifically, the first epoxy crosslinking agent may be ethylene glycol diglycidyl ether, diethylene glycol diglycidyl ether, or a combination thereof, and preferably, ethylene glycol diglycidyl ether.

Preferably, the first epoxy crosslinking agent may be ethylene glycol diglycidyl ether or diethylene glycol diglycidyl ether having an epoxy equivalent weight of 110 g/eq to 125 g/eq.

As the second epoxy crosslinking agent, an epoxy crosslinking agent having a higher epoxy equivalent weight than the first epoxy crosslinking agent may be used in order to obtain a double crosslinking effect. Specifically, an epoxy crosslinking agent having an epoxy equivalent weight of 130 g/eq or more, 150 g/eq or more, or 180 g/eq or more, and 400 g/eq or less, or 380 g/eq or less may be used. When the epoxy equivalent weight of the second epoxy crosslinking agent is too high, the length of the crosslinked chain may be too long, leading to problems in gel strength, and thus it is preferable to satisfy the above range.

As the second epoxy crosslinking agent, a bifunctional epoxy crosslinking agent may be appropriately used. Specifically, one or more of poly(ethylene glycol) diglycidyl ethers having 3 to 15 ethylene glycol ($—CH_2CH_2O—$) repeating units may be used. Preferably, the second epoxy crosslinking agent may be poly(ethylene glycol) diglycidyl ether having 4 to 13 ethylene glycol repeating units. Preferably, the second epoxy crosslinking agent may be poly(ethylene glycol) diglycidyl ether having an epoxy equivalent weight of 180 g/eq to 380 g/eq and having 4 to 13 ethylene glycol repeating units.

The internal crosslinking agent may be included in an amount of 0.001 part by weight to 1.0 part by weight with respect to 100 parts by weight of the acrylic acid-based monomer, thereby crosslinking the polymerized polymer.

In this regard, the first epoxy crosslinking agent and the second epoxy crosslinking agent may be included in an amount of 0.01 part by weight to 0.5 parts by weight with respect to 100 parts by weight of the acrylic acid-based monomer, respectively.

Specifically, the first epoxy crosslinking agent may be included in an amount of 0.1 part by weight or more, 0.2 parts by weight or more, or 0.25 parts by weight or more and 0.4 parts by weight or less, or 0.3 parts by weight or less with respect to 100 parts by weight of the acrylic acid-based monomer, and the second epoxy crosslinking agent may be included in an amount of 0.01 part by weight or more, or 0.02 parts by weight or more and 0.15 parts by weight or less, 0.1 parts by weight or less, or 0.06 parts by weight or less with respect to 100 parts by weight of the acrylic acid-based monomer.

Meanwhile, a content ratio of the first epoxy crosslinking agent and the second epoxy crosslinking agent is not particularly limited, and may be appropriately controlled according to the kind and characteristics of the used crosslinking agents. However, to secure an appropriate crosslinking degree of the polymer and flexibility and gel strength of the crosslinked polymer network, a weight ratio of first epoxy crosslinking agent:second epoxy crosslinking agent may be preferably 1:1 to 30:1, or 3:1 to 20:1, or 4:1 to 14:1.

In the preparation method of the present invention, the monomer composition of the superabsorbent polymer may further include an additive such as a thickener, a plasticizer, a preservation stabilizer, an antioxidant, etc., if necessary.

The raw materials such as the above-described acrylic acid-based monomer having acidic groups which are at least partially neutralized, photo-polymerization initiator, thermal polymerization initiator, internal crosslinking agent, and additive may be prepared in the form of a monomer composition solution in which the raw materials are dissolved in a solvent.

As the solvent to be applicable, any solvent may be used without limitations in view of the constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

The solvent may be included at a residual quantity except for the above components with respect to the total weight of the monomer composition.

Meanwhile, the method of preparing the water-containing gel polymer by thermal polymerization or photo-polymerization of the monomer composition is not particularly limited, as long as it is a common polymerization method.

Specifically, the polymerization method is largely classified into the thermal polymerization and the photo-polymerization according to a polymerization energy source. The thermal polymerization may be commonly carried out in a reactor like a kneader equipped with agitating spindles whereas the photo-polymerization may be carried out in a reactor equipped with a movable conveyor belt. The above-described polymerization method is an example only, and the present invention is not limited to the above-described polymerization methods.

For example, the water-containing gel polymer may be obtained by performing thermal polymerization while providing hot air to the above-described reactor like a kneader equipped with the agitating spindles or heating the reactor. The water-containing gel polymer may have a size of centimeters or millimeters when it is discharged from an outlet of the reactor, according to the type of agitating spindles equipped in the reactor. Specifically, the size of the obtained water-containing gel polymer may vary depending on a concentration of the monomer composition fed thereto, a feeding speed or the like, and the water-containing gel polymer having a weight average particle size of 2 mm to 50 mm may be generally obtained.

Further, as described above, when the photo-polymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer composition fed thereto and the feeding speed. Usually, it is preferable to supply the monomer composition so that a sheet-like polymer having a thickness of about 0.5 cm to about 5 cm may be obtained. When the monomer composition is supplied to such an extent that the thickness of the sheet-like polymer becomes too thin, it is undesirable because the production efficiency is low, and when the thickness of the sheet-like polymer is more than 5 cm, the polymerization reaction may not evenly occur over the entire thickness because of the excessive thickness.

The water-containing gel polymer obtained by the above-mentioned method may have a water content of about 40% by weight to about 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

Next, the step of drying the obtained water-containing gel polymer is performed.

Herein, to increase the drying efficiency, a coarse pulverizing step may be further performed before the drying step, if necessary.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the pulverization step may be carried out so that the particle diameter of the water-containing gel polymer becomes about 2 mm to about 10 mm.

Pulverizing of the water-containing gel polymer into a particle diameter of less than 2 mm is not technically easy due to its high water content, and an agglomeration phenomenon between the pulverized particles may occur. Meanwhile, when the polymer is pulverized into a particle diameter of greater than 10 mm, the effect of increasing the efficiency in the subsequent drying step may be insignificant.

The water-containing gel polymer pulverized as above or the water-containing gel polymer immediately after polymerization without the pulverizing step is subjected to a drying step. In this regard, a drying temperature of the drying step may be about 150° C. to about 250° C. When the drying temperature is lower than 150° C., the drying time becomes too long and the physical properties of the final superabsorbent polymer may be deteriorated. When the drying temperature is higher than 250° C., only the polymer surface is excessively dried, and thus fine powder may be generated during the subsequent pulverization process and the physical properties of the superabsorbent polymer finally formed may be deteriorated. Therefore, the drying may be preferably performed at a temperature of about 150° C. to about 200° C., and more preferably at a temperature of about 160° C. to about 180° C.

Meanwhile, the drying step may be carried out for about 20 minutes to about 90 minutes, in consideration of the process efficiency, but is not limited thereto.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation or ultraviolet irradiation. When the drying step as above is finished, the water content of the polymer may be about 0.1% by weight to about 10% by weight.

Next, the step of pulverizing the dried polymer obtained through the drying step is performed.

The polymer powder obtained through the pulverizing step may have a particle diameter of about 150 μm to about 850 μm. Specific examples of a pulverizer that may be used to achieve the above particle diameter may include a pin mill, a hammer mill, a screw mill, a roll mill, a disc mill, a jog mill, etc., but the present invention is not limited to the above-described examples.

In order to manage the physical properties of the superabsorbent polymer powder that is finally commercialized after the pulverization step, a separate process of size-sorting the polymer powders obtained after the pulverization according to the particle size may be carried out. The polymer powders may be size-sorted to have a constant weight ratio according to the particle size.

Next, the dried and pulverized polymer, i.e., the base resin is mixed with a surface crosslinking agent.

In the general method of preparing a superabsorbent polymer, a surface crosslinking solution containing a surface crosslinking agent is mixed with a dried and pulverized polymer, that is, a base resin, and then the mixture is heated to carry out a surface crosslinking reaction of the pulverized polymer.

The surface crosslinking step is a step of inducing a crosslinking reaction on the surface of the pulverized polymer in the presence of a surface crosslinking agent to form a superabsorbent polymer having improved physical properties. Through the surface crosslinking, a surface crosslinked layer (surface modified layer) is formed on the surface of the pulverized polymer particles.

Generally, surface crosslinking agents are applied on the surface of the superabsorbent polymer particles, so that surface crosslinking reactions occur on the surface of the superabsorbent polymer particles, which improves crosslinkability on the surface of the particles without substantially affecting the interior of the particles. Therefore, the surface crosslinked superabsorbent polymer particles have a higher degree of crosslinking near the surface than in the interior.

Meanwhile, the surface crosslinking agent is a compound capable of reacting with functional groups of the polymer. For example, polyalcohol compounds, epoxy compounds, polyamine compounds, haloepoxy compounds, condensates of haloepoxy compounds, oxazoline compounds, multivalent metal salts, or alkylene carbonate compounds may be used.

Preferably, to further improve absorbency without deteriorating the rewetting property of the superabsorbent polymer, epoxy-based surface crosslinking agents may be used.

Examples of the epoxy-based surface crosslinking agent satisfying the above conditions may include ethylene glycol diglycidyl ether, diethylene glycol diglycidyl ether, triethyleneglycol diglycidyl ether, tetraethyleneglycol diglycidyl ether, glycerin polyglycidyl ether, sorbitol polyglycidyl ether, etc.

The amount of the epoxy-based surface crosslinking agent to be added may be about 0.005 parts by weight or more, or about 0.01 part by weight or more, or about 0.02 parts by weight or more, and about 0.2 parts by weight or less, or about 0.1 part by weight or less, or 0.05 parts by weight or less with respect to 100 parts by weight of the base resin.

When the amount of the epoxy-based surface crosslinking agent is too small, crosslinking density of the surface crosslinked layer is too low, and absorption properties such as absorbency under pressure, liquid permeability becomes low, and when the amount thereof is too large, the rewetting property may deteriorate due to excessive surface crosslinking reaction.

When the epoxy-based surface crosslinking agent is added, it is additionally mixed with water, and then added in the form of a surface crosslinking solution. When water is added, it is advantageous in that the surface crosslinking agent may be evenly dispersed in the polymer. At this time, the amount of water to be added may be preferably about 1 part by weight to about 10 parts by weight with respect to 100 parts by weight of the polymer in order to induce uniform dispersion of the surface crosslinking agent, to prevent agglomeration of the polymer powder, and at the same time, to optimize the surface penetration depth of the surface crosslinking agent.

Meanwhile, in addition to the above-described surface crosslinking agent, a multivalent metal salt, for example, an aluminum salt, more specifically, one or more selected from the group consisting of sulfates, potassium salts, ammonium salts, sodium salts, and hydrochloride salts of aluminum may be further included.

As the multivalent metal salt is additionally used, the liquid permeability of the superabsorbent polymer prepared by the method of one embodiment may be further improved. The multivalent metal salt may be added, together with the surface crosslinking agent, to the surface crosslinking solution, and may be used in an amount of 0.01 part by weight to 4 parts by weight with respect to 100 parts by weight of the base resin.

Next, the step of surface-modifying the base resin may be performed by raising the temperature of the mixture of the base resin and the epoxy-based surface crosslinking agents by heating.

The surface modification step may be performed by heating at a temperature of about 120° C. to about 190° C., preferably about 130° C. to about 180° C. for about 10 minutes to about 90 minutes, preferably about 20 minutes to about 70 minutes. If the crosslinking reaction temperature is lower than 120° C. or the reaction time is too short, the surface crosslinking reaction does not properly occur and thus permeability may be reduced, and if the crosslinking reaction temperature is higher than 190° C. or the reaction time is too long, there is a problem in that water retention capacity may be reduced.

A means for raising the temperature for surface modification reaction is not particularly limited. Heating may be performed by providing a heating medium or by directly providing a heat source. In this regard, the kind of the applicable heating medium may be a hot fluid such as steam, hot air, hot oil or the like, but the present invention is not limited thereto. The temperature of the heating medium to be provided may be properly controlled in consideration of the means of the heating medium, the heating rate, and the target temperature. Meanwhile, as the heat source to be directly provided, an electric heater or a gas heater may be used, but the present invention is not limited to these examples.

By the above surface modification step, a surface crosslinked structure formed by reacting the functional groups of epoxy-based surface crosslinking agents with the functional groups of the base resin is formed on the surface of the base resin. Inside this surface-crosslinked structure, a surface-modified layer in which the above-described hydrophobic material is uniformly distributed may be formed.

In the superabsorbent polymer prepared by the preparation method of the present invention, the base resin has the double crosslinking structure due to the two kinds of epoxy-based internal crosslinking agents having the different epoxy equivalent weights, and a number of pores are formed on the surface of the superabsorbent polymer due to the sodium polycarboxylate surfactant. Therefore, the superabsorbent polymer may have improved rewetting property and initial absorption rate while maintaining excellent centrifuge retention capacity.

According to another embodiment of the present invention, provided is a superabsorbent polymer including:
a base resin including a crosslinked polymer in which an acrylic acid-based monomer having acidic groups which are at least partially neutralized is crosslinked in the presence of an internal crosslinking agent including a first epoxy crosslinking agent having an epoxy equivalent weight of 100 g/eq or more to less than 130 g/eq, and a second epoxy crosslinking agent having an epoxy equivalent weight of 130 g/eq or more; and a surface crosslinked layer which is formed on the particle surface of the base resin and is prepared by further crosslinking the crosslinked polymer via a surface crosslinking agent.

Detailed descriptions of a specific method of preparing the superabsorbent polymer and physical properties thereof are the same as those described in the method of preparing a superabsorbent polymer.

The superabsorbent polymer may have centrifuge retention capacity (CRC) in the range of about 29.5 g/g or more, or about 30 g/g or more, and about 40 g/g or less, about 38 g/g or less, or about 37 g/g or less, as measured in accordance with the EDANA method WSP 241.3.

Further, the superabsorbent polymer may have 1-min tap water absorbency of 113 g/g or more, or 117 g/g or more, the 1-min tap water absorbency defined by the weight of tap water absorbed by the superabsorbent polymer, when 1 g of the superabsorbent polymer is added to 1000 ml of tap water, and left for 1 minute. As the 1-min tap water absorbency is higher, it means more excellent performance. Therefore, there is no theoretical upper limit, but it may be, for example, 150 g/g or less, or 130 g/g or less.

Further, the superabsorbent polymer may exhibit more improved rewetting property while exhibiting excellent absorption properties.

Specifically, the superabsorbent polymer may have the rewetting property (long-term brine rewetting under pressure) of 1.4 g or less, 1.36 g or less, or 1.3 g or less, the rewetting property defined by the weight of brine that soaks out from the superabsorbent polymer to a filter paper, when 4 g of the superabsorbent polymer is immersed in 100 g of brine and allowed to swell for 2 hours, and then the swollen superabsorbent polymer is left on the filter paper under a pressure of 0.75 psi for 5 minutes. As the weight of the brine is smaller, it means more excellent rewetting property. Therefore, the theoretical lower limit is 0 g, but it may be, for example, 0.1 g or more, or 0.5 g or more.

As described above, the superabsorbent polymer of the present invention may have excellent absorbency and may suppress rewetting and urine leakage phenomena even at the time of absorbing a large amount of urine.

The present invention will be described in more detail with reference to the following Examples. However, the following Examples are only for illustrating the present invention, and the description of the present invention is not limited by the following Examples.

EXAMPLE

Preparation of Sodium Polycarboxylate Surfactant

Preparation Example 1

400 parts by weight of ion exchange water was added to a 3-L 4-neck flask reactor equipped with a stirrer, a thermometer, a nitrogen feeder, and a circulation condenser, and the inside of the reactor was replaced with nitrogen under stirring, and heated to 75° C. under a nitrogen atmosphere.

3 parts by weight of ammonium persulfate was added to the reactor, and completely dissolved, and then a monomer aqueous solution including a mixture of 600 parts by weight of methoxypolyethylene glycol monomethacrylate (average addition mole number of ethylene oxide (EO): about 50 moles), 99.6 parts by weight of methacrylic acid, and 200 parts by weight of water, and a mixed solution of 5 parts by weight of 3-mercaptopropionic acid and 60 parts by weight of water, and 150 parts by weight of an aqueous ammonium persulfate solution having a concentration of 3% by weight were continuously added at a constant rate over 4 hours. After completion of the addition, 5 parts by weight of an aqueous ammonium persulfate solution having a concentration of 3% by weight was added at once.

Thereafter, the internal temperature of the reactor was raised to 85° C. and maintained at 85° C. for 30 minutes, thereby completing polymerization.

The polycarboxylic acid-based copolymer thus prepared had a weight average molecular weight of 26,000 g/mol, as measured by gel permeation chromatography (GPC), and its density was 1.10 g/ml.

Preparation of Superabsorbent Polymer

Example 1

(1) Preparation of Base Resin 510 g of acrylic acid, 1.43 g (0.28 parts by weight with respect to 100 parts by weight of acrylic acid) of ethylene glycol diglycidyl ether (EGDGE, epoxy equivalent weight of 113 g/eq), 0.1 g (0.02 parts by weight with respect to 100 parts by weight of acrylic acid) of poly(ethylene glycol) diglycidyl ether having 4 ethylene glycol repeating units (PEGDGE, epoxy equivalent weight of 185 g/eq), 0.51 g of a sodium polycarboxylate surfactant (0.1 part by weight with respect to 100 parts by weight of acrylic acid) prepared in Preparation Example 1, and 0.04 g of diphenyl(2,4,6-trimethylbenzoyl)-phosphine oxide were added to a 3-L glass container equipped with a stirrer, a nitrogen feeder, and a thermometer, and dissolved. Then, 809.5 g of 24.5% sodium hydroxide solution was added thereto and nitrogen was continuously injected to prepare a water-soluble unsaturated monomer aqueous solution. The water-soluble unsaturated monomer aqueous solution was cooled to 40° C.

500 g of this aqueous solution was fed to a stainless steel container having a width of 250 mm, a length of 250 mm, and a height of 30 mm, and UV polymerization was performed by UV radiation (exposure dose: 10 mV/cm$^2$) for 90 seconds to obtain a water-containing gel polymer. The water-containing gel polymer thus obtained was pulverized to a size of 2 mm*2 mm, and then the obtained gel-type resin was spread as thick as about 30 mm on a stainless wire gauze having a hole size of 600 μm and dried in a hot air oven at 180° C. for 30 minutes. The dry polymer thus obtained was pulverized with a pulverizer, and then size-sorted through an ASTM standard sieve to obtain a base resin having a particle size of 150 μm to 850 μm.

(2) Preparation of Superabsorbent Polymer 6.0 parts by weight of water, 0.02 parts by weight of ethylene glycol diglycidyl ether, and 0.4 parts by weight of aluminum sulfate were added to 100 parts by weight of the base resin, and mixed with each other. This mixture was put in a container equipped with a stirrer and a double jacket, and a surface crosslinking reaction was performed at 140° C. for 35 minutes. Thereafter, the surface-treated powder was size-sorted through an ASTM standard sieve to obtain a superabsorbent polymer powder having a particle size of 150 μm to 850 μm.

Example 2

A superabsorbent polymer powder was obtained in the same manner as in Example 1, except that 0.5 parts by weight of the sodium polycarboxylate surfactant was used with respect to 100 parts by weight of acrylic acid in step (1).

Example 3

A superabsorbent polymer powder was obtained in the same manner as in Example 1, except that 0.04 parts by weight of poly(ethylene glycol) diglycidyl ether (epoxy equivalent weight of 268 g/eq) having 9 ethylene glycol repeating units was used, instead of poly(ethylene glycol) diglycidyl ether having 4 ethylene glycol repeating units, with respect to 100 parts by weight of acrylic acid in step (1).

Example 4

A superabsorbent polymer powder was obtained in the same manner as in Example 1, except that 0.06 parts by weight of poly(ethylene glycol) diglycidyl ether (epoxy equivalent weight of 372 g/eq) having 13 ethylene glycol repeating units was used, instead of poly(ethylene glycol) diglycidyl ether having 4 ethylene glycol repeating units, with respect to 100 parts by weight of acrylic acid in step (1).

Example 5

A superabsorbent polymer powder was obtained in the same manner as in Example 1, except that diethylene glycol diglycidyl ether (DGDGE, epoxy equivalent weight of 122 g/eq) was used, instead of ethylene glycol diglycidyl ether in step (1).

Example 6

A superabsorbent polymer powder was obtained in the same manner as in Example 2, except that diethylene glycol diglycidyl ether (DGDGE, epoxy equivalent weight of 122 g/eq) was used, instead of ethylene glycol diglycidyl ether in step (1).

Example 7

A superabsorbent polymer powder was obtained in the same manner as in Example 3, except that diethylene glycol diglycidyl ether (DGDGE, epoxy equivalent weight of 122 g/eq) was used, instead of ethylene glycol diglycidyl ether in step (1).

Example 8

A superabsorbent polymer powder was obtained in the same manner as in Example 4, except that diethylene glycol diglycidyl ether (DGDGE, epoxy equivalent weight of 122 g/eq) was used, instead of ethylene glycol diglycidyl ether in step (1).

Comparative Example 1

A superabsorbent polymer powder was obtained in the same manner as in Example 1, except that, as the internal crosslinking agent, poly(ethylene glycol) diglycidyl ether having 4 ethylene glycol repeating units was not included, only ethylene glycol diglycidyl ether was used in an amount of 0.30 parts by weight with respect to 100 parts by weight of acrylic acid, and the sodium polycarboxylate surfactant was not included in step (1).

Comparative Example 2

A superabsorbent polymer powder was obtained in the same manner as in Example 1, except that, as the internal crosslinking agent, ethylene glycol diglycidyl ether was not included, only poly(ethylene glycol) diglycidyl ether having 4 ethylene glycol repeating units was used in an amount of 0.30 parts by weight with respect to 100 parts by weight of acrylic acid, and the sodium polycarboxylate surfactant was not included in step (1).

Comparative Example 3

A superabsorbent polymer powder was obtained in the same manner as in Example 1, except that, as the internal crosslinking agent, only poly(ethylene glycol) diglycidyl ether having 94 ethylene glycol repeating units was used in an amount of 0.39 parts by weight with respect to 100 parts by weight of acrylic acid, instead of ethylene glycol diglycidyl ether and poly(ethylene glycol) diglycidyl ether having 4 ethylene glycol repeating units, and the sodium polycarboxylate surfactant was not included in step (1).

Comparative Example 4

A superabsorbent polymer powder was obtained in the same manner as in Example 1, except that, as the internal crosslinking agent, poly(ethylene glycol) diglycidyl ether having 4 ethylene glycol repeating units was not included, and only ethylene glycol diglycidyl ether was used in an amount of 0.30 parts by weight with respect to 100 parts by weight of acrylic acid in step (1).

Experimental Example

Physical properties were evaluated for the superabsorbent polymers prepared in Examples and Comparative Examples by the following methods.

Unless otherwise indicated, the following physical properties were all evaluated at constant temperature and humidity (23±1° C., relative humidity of 50±10%), and physiological saline or brine means a 0.9 wt % sodium chloride (NaCl) aqueous solution.

Further, tap water used in the following evaluation of the 1-min tap water absorbency was tap water having a conductivity of 100 μS/cm to 120 μS/cm, as measured using Orion Star A222 (Thermo Scientific).

(1) Centrifuge Retention Capacity (CRC)

The centrifuge retention capacity by absorption capacity under no load was measured for each polymer in accordance with EDANA WSP 241.3.

In detail, after uniformly introducing $W_0(g)$ (about 0.2 g) of the superabsorbent polymer in a nonwoven fabric-made bag and sealing the same, it was immersed in physiological saline (0.9 wt %) at room temperature. After 30 minutes, the bag was dehydrated by using a centrifuge at 250 G for 3 minutes, and then the weight $W_2(g)$ of the bag was measured. Further, after carrying out the same operation without using the polymer, the weight $W_1(g)$ of the bag was measured. CRC (g/g) was calculated using each obtained weight according to the following Equation:

$$\text{CRC } (g/g) = \{[W_2(g) - W_1(g)]/W_0(g)\} - 1 \qquad \text{[Equation 1]}$$

(2) 1-min Tap Water Absorbency

Each 1.0 g($W_3$) of the superabsorbent polymers of Examples and Comparative Examples was put in a nonwoven fabric-made bag (18 cm×28 cm), and immersed in 1000 mL of tap water at 24° C. for 1 minute. After 1 minute, the bag was taken out of tap water, and hung and left for 1 minute. Thereafter, the weight ($W_5$) of the bag was measured. Further, after carrying out the same operation without using the superabsorbent polymer, the weight ($W_4$) of the bag was measured.

1-min tap water absorbency (g/g) was calculated using each obtained weight according to the following Equation 2:

$$\text{1-min tap water absorbency} = \{[W_5(g) - W_4(g) - W_3(g)]/W_3(g)\} \qquad \text{[Equation 2]}$$

(3) Long-term Brine Rewetting Under Pressure (2 Hrs)

① 4 g of the superabsorbent polymer was uniformly scattered on a petri dish with a diameter of 13 cm, and then 100 g of brine was poured and allowed to swell.

② The superabsorbent polymer was swollen for 2 hours, and then 20 sheets of filter paper having a diameter of 11 cm (manufacturer: whatman, catalog No. 1004-110, pore size: 20-25 μm, diameter: 11 cm) was put on the swollen gel, and a weight of 5 kg (0.75 psi) with a diameter of 11 cm was applied thereto for 5 minutes.

③ After applying the weight for 5 minutes, the amount (unit: g) of brine soaked into the filter paper was measured.

The values of the physical properties of Examples and Comparative Examples are described in Table 1 below.

TABLE 1

| | Content of internal crosslinking agent* | | Content of surfactant* | Superabsorbent polymer | | |
|---|---|---|---|---|---|---|
| | First crosslinking agent | Second crosslinking agent (PEGDGE, n: number of repeating units) | | CRC (g/g) | 1-min tap water absorbency (g/g) | Long-term brine rewetting under pressure (g) |
| Example 1 | 0.28 (EGDGE) | 0.02 (n = 4) | 0.1 | 29.8 | 121 | 1.12 |
| Example 2 | 0.28 (EGDGE) | 0.02 (n = 4) | 0.5 | 31.5 | 117 | 1.15 |
| Example 3 | 0.28 (EGDGE) | 0.04 (n = 9) | 0.1 | 30.6 | 123 | 1.29 |
| Example 4 | 0.28 (EGDGE) | 0.06 (n = 13) | 0.1 | 31.3 | 118 | 1.31 |
| Example 5 | 0.28 (DGDGE) | 0.02 (n = 4) | 0.1 | 30.0 | 119 | 1.16 |
| Example 6 | 0.28 (DGDGE) | 0.02 (n = 4) | 0.5 | 31.5 | 122 | 1.21 |
| Example 7 | 0.28 (DGDGE) | 0.04 (n = 9) | 0.1 | 30.7 | 123 | 1.31 |
| Example 8 | 0.28 (DGDGE) | 0.06 (n = 13) | 0.1 | 31.3 | 120 | 1.36 |
| Comparative Example 1 | 0.30 (EGDGE) | — | — | 29.2 | 106 | 1.59 |
| Comparative Example 2 | — | 0.30 (n = 4) | — | 28.3 | 98 | 1.52 |
| Comparative Example 3 | — | 0.39 (n = 9) | — | 30.2 | 103 | 1.53 |
| Comparative Example 4 | 0.30 (EGDGE) | — | 0.1 | 29.8 | 112 | 1.45 |

*parts by weight with respect to 100 parts by weight of acrylic acid

Referring to Table 1, it was confirmed that the superabsorbent polymers of Examples prepared according to the present invention exhibited excellent water retention capacity while having greatly improved 1-min tap water absorbency and brine rewetting property. However, when only one of the first and second epoxy crosslinking agents was used as the internal crosslinking agent, 1-min tap water absorbency and rewetting property were deteriorated, as compared with Examples.

These results suggest that the superabsorbent polymers according to the present invention maintain excellent basic absorption properties, such as water retention capacity, etc. while securing improved liquid permeability and rewetting property.

The invention claimed is:

1. A method of preparing a superabsorbent polymer, comprising:
   preparing a base resin in which an acrylic acid-based monomer having acidic groups which are at least partially neutralized and an internal crosslinking agent are crosslinked in the presence of a sodium polycarboxylate surfactant; and
   heating the base resin in the presence of a surface crosslinking agent to carry out surface modification of the base resin,
   wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more.

2. The method of claim 1, wherein the sodium polycarboxylate surfactant is included in an amount of 0.01 part by weight to 1 part by weight with respect to 100 parts by weight of the acrylic acid-based monomer.

3. The method of claim 1, wherein the sodium polycarboxylate surfactant has a density of 1.07 g/ml to 1.13 g/ml, and a weight average molecular weight of 500 g/mol to 1,000,000 g/mol.

4. The method of claim 1, wherein the second epoxy crosslinking agent has an epoxy equivalent weight of 150 g/eq to 400 g/eq.

5. The method of claim 1, wherein the first epoxy crosslinking agent and the second epoxy crosslinking agent are included in an amount of 0.01 part by weight to 0.5 parts by weight, respectively, with respect to 100 parts by weight of the acrylic acid-based monomer.

6. The method of claim 1, wherein a weight ratio of first epoxy crosslinking agent:second epoxy crosslinking agent is 1:1 to 30:1.

7. The method of claim 1, wherein the first epoxy crosslinking agent is ethylene glycol diglycidyl ether, diethylene glycol diglycidyl ether, or a combination thereof.

8. The method of claim 1, wherein the second epoxy crosslinking agent is one or more selected from the group consisting of poly(ethylene glycol) diglycidyl ethers having 3 to 15 ethylene glycol repeating units.

9. The method of claim 1, wherein the surface crosslinking agent is one or more selected from the group consisting of ethylene glycol diglycidyl ether, diethylene glycol diglycidyl ether, triethyleneglycol diglycidyl ether, tetraethyleneglycol diglycidyl ether, glycerin polyglycidyl ether, and sorbitol polyglycidyl ether.

10. The method of claim 1, wherein the preparing the base resin includes:
    forming a water-containing gel polymer by polymerizing a monomer composition including the acrylic acid-based monomer having acidic groups which are at least partially neutralized, the internal crosslinking agent including the first epoxy crosslinking agent and the second epoxy crosslinking agent, the sodium polycarboxylate surfactant, and a polymerization initiator;
    drying the water-containing gel polymer;
    pulverizing the dried polymer; and
    size-sorting the pulverized polymer.

11. A superabsorbent polymer comprising:
    a base resin including a crosslinked polymer in which an acrylic acid-based monomer having acidic groups which are at least partially neutralized is crosslinked in the presence of a sodium polycarboxylate surfactant and an internal crosslinking agent including a first epoxy crosslinking agent having an epoxy equivalent weight of 100 g/eq or more to less than 130 g/eq, and a second epoxy crosslinking agent having an epoxy equivalent weight of 130 g/eq or more; and a surface crosslinked layer which is formed on the particle surface of the base resin and is prepared by further crosslinking the crosslinked polymer via a surface crosslinking agent.

12. The superabsorbent polymer of claim 11, wherein the superabsorbent polymer has a centrifuge retention capacity (CRC) of 29.5 g/g or more.

13. The superabsorbent polymer of claim 11, wherein the superabsorbent polymer has 1-min tap water absorbency of 113 g/g or more, the 1-min tap water absorbency defined by the weight of tap water absorbed by the superabsorbent polymer, when 1 g of the superabsorbent polymer is put in 1000 mL of tap water and left for 1 minute.

14. The superabsorbent polymer of claim 11, wherein the superabsorbent polymer has a long-term brine rewetting under pressure of 1.4 g or less, the long-term brine rewetting defined by the weight of brine that soaks out from the superabsorbent polymer to a filter paper, when 4 g of the superabsorbent polymer is immersed in 100 g of brine and allowed to swell for 2 hours, and then the swollen superabsorbent polymer is left on the filter paper under a pressure of 0.75 psi for 5 minutes.

15. The method of claim 11, wherein the second epoxy crosslinking agent has the epoxy equivalent weight of 130 g/eq or more to 400 g/eq or less.

16. The superabsorbent polymer of claim 12, wherein the CRC of the superabsorbent polymer is 29.5 g/g or more to 40 g/g or less.

17. The superabsorbent polymer of claim 13, wherein the superabsorbent polymer has a long-term brine rewetting under pressure of 1.4 g or less, the long-term brine rewetting defined by the weight of brine that soaks out from the superabsorbent polymer to a filter paper, when 4 g of the superabsorbent polymer is immersed in 100 g of brine and allowed to swell for 2 hours, and then the swollen superabsorbent polymer is left on the filter paper under a pressure of 0.75 psi for 5 minutes.

* * * * *